United States Patent
Kovalov

(10) Patent No.: US 10,103,468 B2
(45) Date of Patent: Oct. 16, 2018

(54) COATING DISPLACEMENT ELECTRICAL CONNECTING DEVICE AND RELATED METHODS

(71) Applicant: KD&E Solar, LLC, Manchester, NH (US)

(72) Inventor: Paul Kovalov, Manchester, NH (US)

(73) Assignee: KD&E SOLAR, LLC., Manchester, NH (US)

(*) Notice: Subject to any disclaimer, the term of this patent is extended or adjusted under 35 U.S.C. 154(b) by 207 days.

(21) Appl. No.: 15/057,498

(22) Filed: Mar. 1, 2016

(65) Prior Publication Data
US 2016/0261061 A1    Sep. 8, 2016

Related U.S. Application Data

(60) Provisional application No. 62/129,323, filed on Mar. 6, 2015.

(51) Int. Cl.
| | |
|---|---|
| *H01R 4/26* | (2006.01) |
| *H01R 13/03* | (2006.01) |
| *H01R 43/26* | (2006.01) |
| *F16B 43/00* | (2006.01) |
| *F16B 1/00* | (2006.01) |

(52) U.S. Cl.
CPC ........... *H01R 13/03* (2013.01); *F16B 43/001* (2013.01); *H01R 4/26* (2013.01); *H01R 43/26* (2013.01); *F16B 2001/0064* (2013.01)

(58) Field of Classification Search
CPC .............................................. F16B 2001/0064
USPC ........................................ 411/163–165, 903
See application file for complete search history.

(56) References Cited

U.S. PATENT DOCUMENTS

| | | | |
|---|---|---|---|
| 2,895,524 A | 7/1959 | Boyd | |
| 3,626,357 A | 12/1971 | Kindell | |
| 3,855,383 A * | 12/1974 | Dahlgren | B29C 65/7885 264/230 |
| 3,945,704 A * | 3/1976 | Kraus | H01R 4/2495 340/665 |
| 4,023,882 A | 5/1977 | Pettersson | |
| 4,215,908 A * | 8/1980 | Cherry | H01R 11/26 439/435 |
| 4,813,833 A * | 3/1989 | Haab | F16B 33/006 411/184 |
| 5,041,014 A | 8/1991 | Shimizu | |
| 5,051,049 A * | 9/1991 | Wills | F16B 27/00 411/165 |

(Continued)

OTHER PUBLICATIONS

SM Solar Mount Installation Guide, Nov. 14, 2003, p. 11 and 13-14, http://design.unirac.com/media/docs/141103.PUB_SM_QSG_1.PDF.

*Primary Examiner* — Flemming Saether
(74) *Attorney, Agent, or Firm* — Hayes Soloway P.C.

(57) ABSTRACT

An electrical connecting apparatus and related systems and methods are provided. The electrical connecting apparatus includes a substantially flat body having a top surface and a bottom surface. At least one electrically conductive tooth is positioned on the body, the at least one tooth having at least one puncture point positioned beyond at least one of the top and bottom surfaces, respectively. A coating is positioned on the at least one tooth. In use, when the electrical connecting apparatus is compressed, the at least one puncture point on the at least one tooth pierces through the coating thereon.

15 Claims, 12 Drawing Sheets

(56) References Cited

U.S. PATENT DOCUMENTS

| | | | |
|---|---|---|---|
| 5,828,008 A | 10/1998 | Lockwood | |
| 8,070,404 B1 * | 12/2011 | Schluter | F16B 39/282 411/368 |
| 8,303,357 B2 | 11/2012 | Kuwahara | |
| 8,353,650 B2 | 1/2013 | Wiley | |
| 8,777,538 B2 | 7/2014 | Strizki | |
| 8,888,431 B2 | 11/2014 | Haney | |
| 8,997,336 B2 * | 4/2015 | Strizki | F16B 43/001 29/281.5 |
| 2012/0206852 A1 * | 8/2012 | Fitz | B60R 16/06 361/216 |
| 2014/0068930 A1 | 3/2014 | Strizki | |

* cited by examiner

100

| A first metal structure is connected to a second metal structure with a fastener, wherein an electrical connecting device having an insulative coating over a plurality of teeth is positioned between the first and second metal structures. | 102 |

| The fastener is biased to compress the plurality of teeth between the first and second metal structures, thereby compressing at least one puncture point on at least one of the plurality of teeth against at least one of the first and second metal structures, wherein the at least one puncture point displaces the insulative coating on the at least one puncture point. | 104 |

*Fig. 13*

COATING DISPLACEMENT ELECTRICAL CONNECTING DEVICE AND RELATED METHODS

CROSS REFERENCE TO RELATED APPLICATION

This application claims benefit of U.S. Provisional Application Ser. No. 62/129,323 entitled, "Connecting Device with Coating," filed Mar. 6, 2015, the entire disclosure of which is incorporated herein by reference.

FIELD OF THE DISCLOSURE

The present disclosure is generally related to electrical connectors and more particularly is related to electrical connecting devices and related methods.

BACKGROUND OF THE DISCLOSURE

Electrical bonding devices are used in many industries to provide, maintain, and enhance electrical connectivity between metallic components, for example, to properly ground a piece of equipment to its metal frame. Conventional electrical bonding devices commonly include structures which can be positioned between two metal surfaces and permit the flow of electricity from one metal surface to the other through the bonding device. These electrical bonding devices may include, for example, external tooth star washers or conical tooth bonding washers such as WEEB® brand washers, among others. A common trait of all of these electrical bonding devices is the use of serrated or pointed elements on the electrical bonding device to ensure that the electrical connection is successful. These elements, which may include sharpened points, edges, cone tips, cylindrical protrusions, or similar structures, ensure a successful electrical connection by piercing through non-conductive coatings which are commonly found on exterior surfaces of metals. The non-conductive coatings may include anodized surfaces, painted coatings, or similar surface treatments which are intended to prevent corrosion of the metal surface. The electrical bonding devices may be retained in abutment with the metal surfaces to such a degree that the serrated elements pierce through the non-conductive coating and contact the underlying metal.

After these types of conventional electrical bonding devices are installed, including when used as lock washers, a worker would then need to apply a protective sealant or coating to the connection to prevent future corrosion or other adverse effects to the connection. However, due to the intricacies of the structure of these conventional electrical bonding devices, e.g., the numerous gaps, spaces, and angles between the various serrated elements, properly sealing the conventional electrical bonding devices is difficult. If any portion of the conventional electrical bonding device was left uncovered, corrosive liquids and gasses, including those carried by the ambient air, would make contact and negatively affect the electrical bond. As a result, this high susceptibility to corrosion means that many conventional electrical bonding devices are prone to failure. Even when sealing was successful, the process was more complicated and costly to manufacture due to the fact that the sealing material needed to be applied as a secondary item during installation.

Additionally, another shortcoming of conventional electrical bonding devices is that they are often manufactured from stainless steel but used with other types of metals. This dissimilarity in metals exacerbates galvanic corrosion problems between the metal structures due to the fact that the devices are in electrical contact with a metal having a different galvanic potential and fluid electrolytes are more prone to contact unprotected areas of the metals.

Thus, a heretofore unaddressed need exists in the industry to address the aforementioned deficiencies and inadequacies.

SUMMARY OF THE DISCLOSURE

Embodiments of the present disclosure provide a system and method for an electrical connecting apparatus. Briefly described, in architecture, one embodiment of the system, among others, can be implemented as follows. A substantially flat body has a top surface and a bottom surface. At least one electrically conductive tooth is positioned on the body, the at least one tooth having at least one puncture point positioned beyond at least one of the top and bottom surfaces, respectively. A coating is positioned on the at least one tooth.

The present disclosure can also be viewed as providing an electrical connecting device. Briefly described, in architecture, one embodiment of the device, among others, can be implemented as follows. The electrical connecting device comprises a serrated tooth star washer having a plurality of teeth. A coating is positioned over the plurality of teeth, wherein when the star-tooth washer is compressed, at least one puncture point on each of the plurality of teeth pierces through the coating thereon.

The present disclosure can also be viewed as providing a system for providing an electrical connection. Briefly described, in architecture, one embodiment of the system, among others, can be implemented as follows. The system for providing an electrical connection comprises a first metal structure and a second metal structure removably connected to the first metal structure with a fastener. An electrical connecting apparatus is positioned between the first and second metal structures. The electrical connecting apparatus has a substantially flat body with a top surface and a bottom surface, at least one electrically conductive tooth positioned on the body, the at least one tooth having at least one puncture point positioned beyond at least one of the top and bottom surfaces, respectively, and a coating positioned on the at least one tooth.

The present disclosure can also be viewed as providing methods of electrically connecting at least two metal structures together. In this regard, one embodiment of such a method, among others, can be broadly summarized by the following steps: connecting a first metal structure to a second metal structure with a fastener, wherein an electrical connecting device having a coating over at least one tooth is positioned between the first and second metal structures; and biasing the fastener to compress the at least one tooth between the first and second metal structures, thereby compressing at least one puncture point on the at least one tooth against at least one of the first and second metal structures, wherein the at least one puncture point displaces the coating on the at least one puncture point.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 13 is a flowchart illustrating a method of electrically connecting at least two metal structures together, in accordance with the first exemplary embodiment of the disclosure.

DETAILED DESCRIPTION

Figure 1:
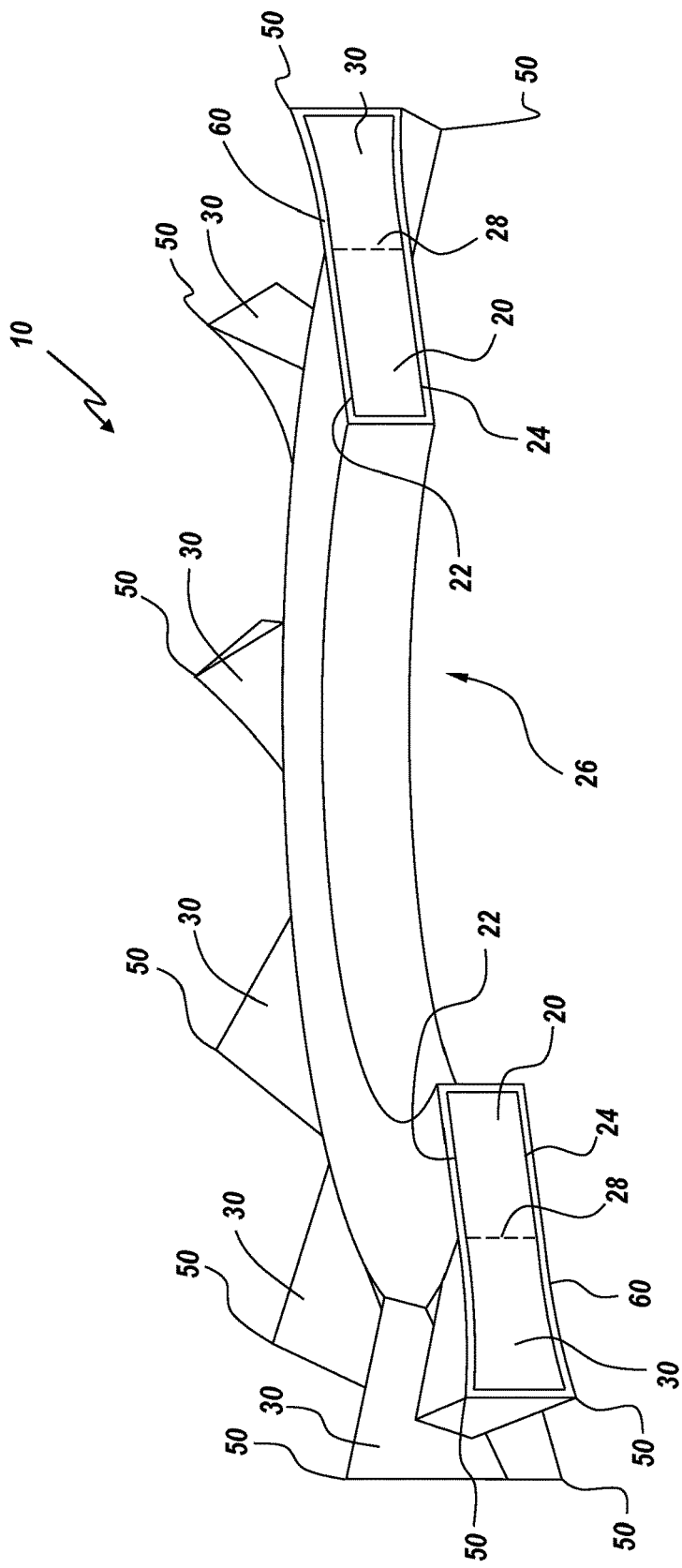
FIG. 1 is a cross-sectional illustration of an electrical connecting apparatus, in accordance with a first exemplary embodiment of the present disclosure.
Figure 2:
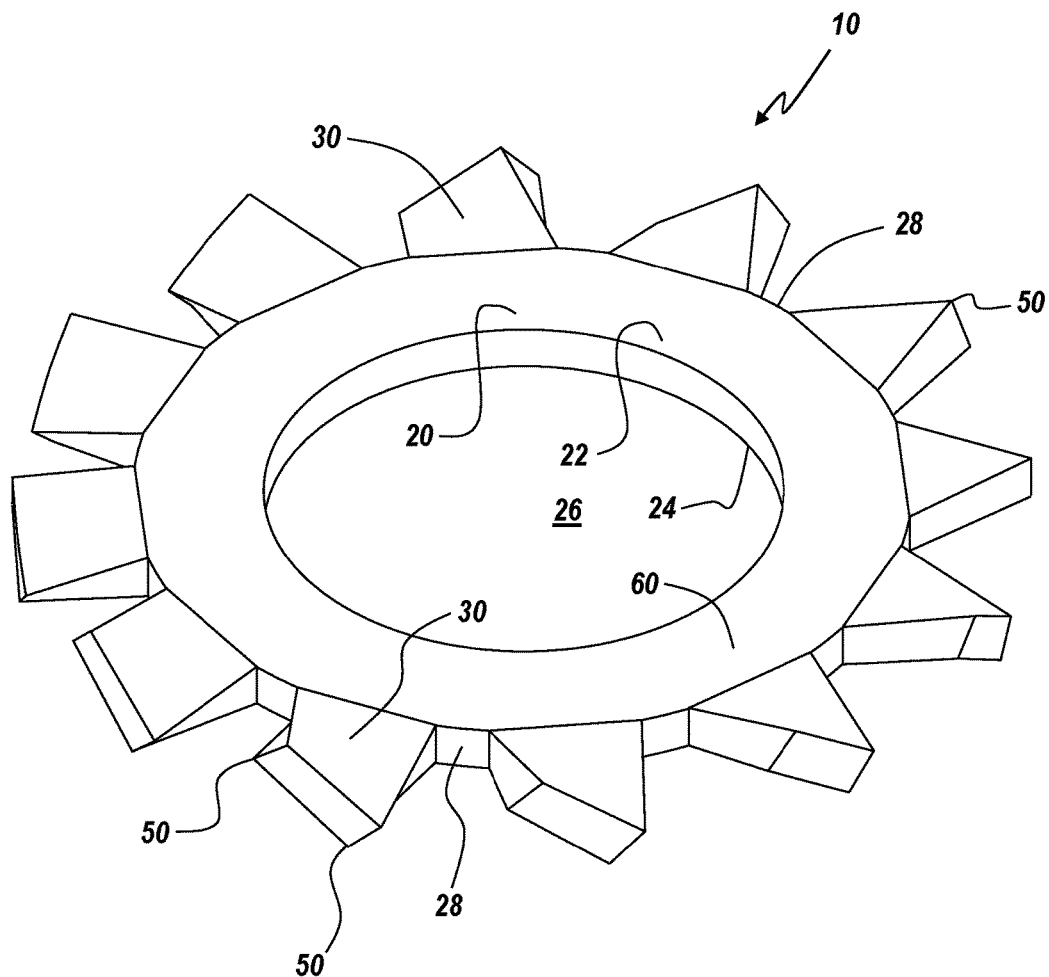
FIG. 2 is an elevated side view illustration of the electrical connecting apparatus of FIG. 1, in accordance with the first exemplary embodiment of the present disclosure.

FIG. 1 is a cross-sectional illustration of an electrical connecting apparatus 10, in accordance with a first exemplary embodiment of the present disclosure. FIG. 2 is an elevated side view illustration of the electrical connecting apparatus 10 of FIG. 1, in accordance with the first exemplary embodiment of the present disclosure. Relative to FIGS. 1-2, the electrical connecting apparatus 10, which may be referred to herein simply as 'apparatus 10,' includes a substantially flat body 20 having a top surface 22 and a bottom surface 24. At least one electrically conductive tooth 30 is positioned on the body 20, the at least one tooth 30 having at least one puncture point 50 positioned beyond at least one of the top and bottom surfaces 22, 24, respectively. A coating 60 is positioned on the at least one tooth 30.

The body 20 of the electrical connecting apparatus 10 often has the shape of a washer used with mechanical fasteners, in that, it has a thin construction with parallel or substantially parallel top and bottom surfaces 22, 24. Depending on the design of the body 20, it is possible for the top and bottom surfaces 22, 24 to have a non-parallel configuration to one another, such as when the body 20 has a tapered construction. Further, it is noted that the body 20 may have the shape of any known washer, such as curved or waved shape to provide a spring function. Commonly, the body 20 may have the shape of a circle with a clearance hole 26 positioned along a central axis of the body 20. The clearance hole 26 may be formed between the top and bottom surfaces 22, 24 such that it is formed fully through the body 20. Commonly, the clearance hole 26 may have a radial dimension that substantially matches a radial dimension of a fastener with which the electrical connecting apparatus 10 is intended to be used. It is noted that the shape of the body 20 may vary from a circular shape, and a clearance hole 26 within the body 20 may be positioned through any portion of the body 20. The body 20 may be formed from metal, metal compounds such as stainless steel, or other hardened materials which are electrically conductive.

The apparatus 10 includes any number of electrically conductive teeth 30 positioned on or formed on the body 20. FIGS. 1 and 2 depict the body 20 having the plurality of teeth 30 in a form similar to that of an external tooth star washer, although it is noted that using only a single tooth is considered within the scope of the present disclosure. As shown, the plurality of teeth 30 are positioned on an exterior radial edge 28 of the body 20 and extend radially outwards from the body 20, i.e., in a direction outward from the clearance hole 26. The exterior radial edge 28 of the body 20 may be positioned in general alignment with a perimeter of the body 20, as shown in FIG. 2 and as indicated by broken lines in FIG. 1. The plurality of teeth 30 may be spaced about the perimeter of the body 20 at various positions, including positions where the teeth 30 are spaced from one another, thereby leaving open portions of the exterior radial edge 28, and positions where the edges of the teeth 30 abut or substantially abut one another, as well as all other possible configurations.

Further, it is noted that the teeth 30 may have a twisted shape where an outermost edge of each tooth 30 is angularly rotated along a central axis of the tooth 30 relative to the portion of the tooth 30 that connects with the exterior radial edge 28 of the body 20. This twisted shape allows one of the corners of the teeth 30 to be raised or extended above the top surface 22 of the body 20 and an opposing corner to be positioned below or extend below the bottom surface 24 of the body 20. Other designs of the plurality of teeth 30 on the body, beyond those having the general twisted shape of a star tooth washer, are also envisioned, all of which are considered within the scope of the present disclosure.

Each of the plurality of teeth 30 may have at least one puncture point 50 formed on it, which generally allows each of the teeth 30 to make a connection with a metal surface on which the apparatus 10 is positioned on, as will be described further in detail. The at least one puncture point 50 may be characterized as a pointed, narrow or sharpened structure formed on one of the teeth 30, such as on an edge or corner of the tooth 30, which is capable of protruding through the coating 60 covering the puncture point 50 when the apparatus 10 is compressed against a hardened structure. As is shown in FIGS. 1-2, the puncture point 50 is formed on the corner of each tooth 30 that is located beyond the top surface 22 or the bottom surface 24 of the body 20, i.e., above or below the top or bottom surface 22, 24, respectively, when viewing the apparatus 10 from a side angle. More specifically, each of the plurality of teeth 30 in FIGS. 1-2 may have at least two puncture points, one on either side or opposing sides of the tooth 30. When combined with the twisted shape of the teeth 30, this design allows for the opposing puncture points 50 to be positioned along both an upper and lower clearance points of the apparatus 10. While the puncture points 50 have been described as being located on the corners of the teeth 30, it is noted that the edges of the teeth 30 can also serve as puncture points 50.

The coating 60 may be formed from any type of polymer, rubber, silicone, or other flexible adhesive or non-adhesive material. The coating 60 may be electrically and/or thermally insulating, either of which may offer benefits. For example, an electrically insulating coating 60 may allow for an electric current to be run through the apparatus 10 in an insulated, sealed environment, thereby preserving electrical performance when the apparatus 10 is used. A thermally conductive coating 60 may offer advantages of allowing the apparatus 10 to carry higher electrical currents without heating up as rapidly as a conventional bonding device without a coating. Commonly, the coating 60 may be formed over an entirety of the apparatus 10, such that it fully surrounds and covers the teeth 30 and the body 20. However, other designs may include the coating 60 covering only a portion of the body 20. Thickness of the layer of coating 60 may vary depending on design of the apparatus 10 as well as vary depending on the location of the body 20 that the coating 60 is positioned over, e.g., certain areas may have a thicker coating 60 than other areas. As will be discussed in further detail below, the coating 60 is, at a minimum, positioned on each of the plurality of teeth 30 to allow the coating 60 to seal against the teeth 30 and the abutting metal structures to which the apparatus 10 is used on to prevent oxidation, galvanic corrosion, or similar undesirable conditions.

Figure 3:
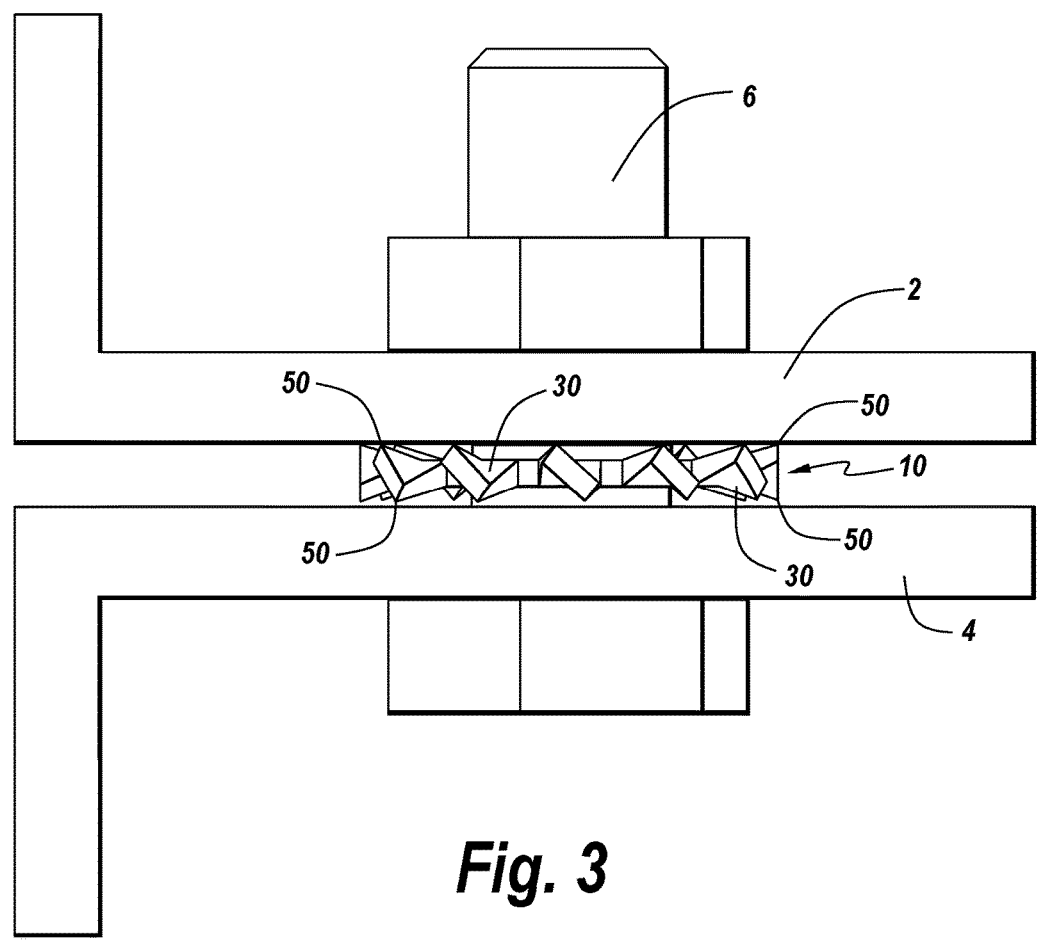
FIG. 3 is a side-view illustration of the apparatus in use with two metal structures before being compressed therebetween, in accordance with the first exemplary embodiment of the present disclosure.

FIG. 3 is a side-view illustration of the apparatus 10 in use with two metal structures before being compressed therebetween, in accordance with the first exemplary embodiment of the present disclosure. As shown, the apparatus 10 may be positioned between two structures 2, 4 that are connected with a fastener 6. The two structures 2, 4 may commonly include two metal structures, such as those found on the frames of industrial equipment, solar devices such as between PV module frames and mounting systems, or similar devices. The structure 2, 4 may include any type of structures which have substantially flat surfaces where an electrical connection is desired or where a mechanical connection is desired, such as an anti-rotation connection between the surfaces. The fastener 6 may include a threaded fastener such as a bolt, a rivet, or another type of fastening device. The apparatus 10 is positioned between the two structures 2, 4 and aligned with the fastener 6, such that the fastener 6 extends through a first structure 2, through a clearance hole of the apparatus 10, and through the second structure 4. The fastener 6 may include the use of a threaded nut or similar device to retain the fastener 6 in this configuration and allow the structures 2, 4 to be biased towards one another.

As the fastener 6 is tightened, i.e., when the nut is threaded further along the bolt, the two structures 2, 4 are biased together until the outer surface of the coating 60 covering the puncture points 50 on each of the teeth 30 makes contact with the two inner-facing surfaces of the two structures 2, 4. FIG. 3 illustrates the apparatus 10 just before coating 60 on the puncture points 50 contacts the inner-facing surfaces of the two structures 2, 4. As the fastener 6 is further tightened, the portion of coating 60 on the puncture points 50 is compressed and the puncture points 50 begin to pierce or displace the coating 60 on the puncture points 50. Eventually, the puncture points 50 may fully pierce the coating 60 and make contact with the two inner-facing surfaces of the two structures 2, 4.

As the fastener 6 is further tightened, the two inner-facing surfaces of the two structures 2, 4 begin to force the teeth 30 inwards, towards a central plane of the body 20. Accordingly, the sharpened edges, corners, or tips of the puncture points 50 begin to pierce the exterior surface of the two inner-facing surfaces of the two structures 2, 4 and eventually are driven into an interior layer of each of the two structures 2, 4 which is positioned interior of the two inner-facing surfaces, respectively. The depth that the puncture point 50 engages with the two structures 2, 4 may be dependent on the compressive force of the fastener 6 on the two structures 2, 4, the contour of the puncture points 50, and the mechanical resistance that the teeth 30 provide to the two inner-facing surfaces of the two structures 2, 4. Regardless of the depth of penetration of the two structures 2, 4 by the puncture points 50, the coating 60 that was displaced from the tip of the puncture point 50 may be snugly positioned along the entire perimeter of the engagement of the puncture point 50 to the two structures 2, 4.

As the fastener 6 is tightened to compress the two structures 2, 4 together, the engagement of the puncture points 50 with the two structures 2, 4 may compress the teeth 30 towards a central plane of the body 20. This biasing of the teeth 30 in a direction substantially perpendicular to the plane of the top and bottom surface of the body 20, may cause each of the teeth 30 to rotate along its central, radial axis, thereby acting to deflect (untwist) the teeth 30 from their orientations shown in FIGS. 1-3. The resistance to deflection by the teeth 30 provides, at least in part, the force required to allow the puncture points 50 to engage with the two structures 2, 4 in response to the two structures 2, 4 being biased together.

Figure 4:
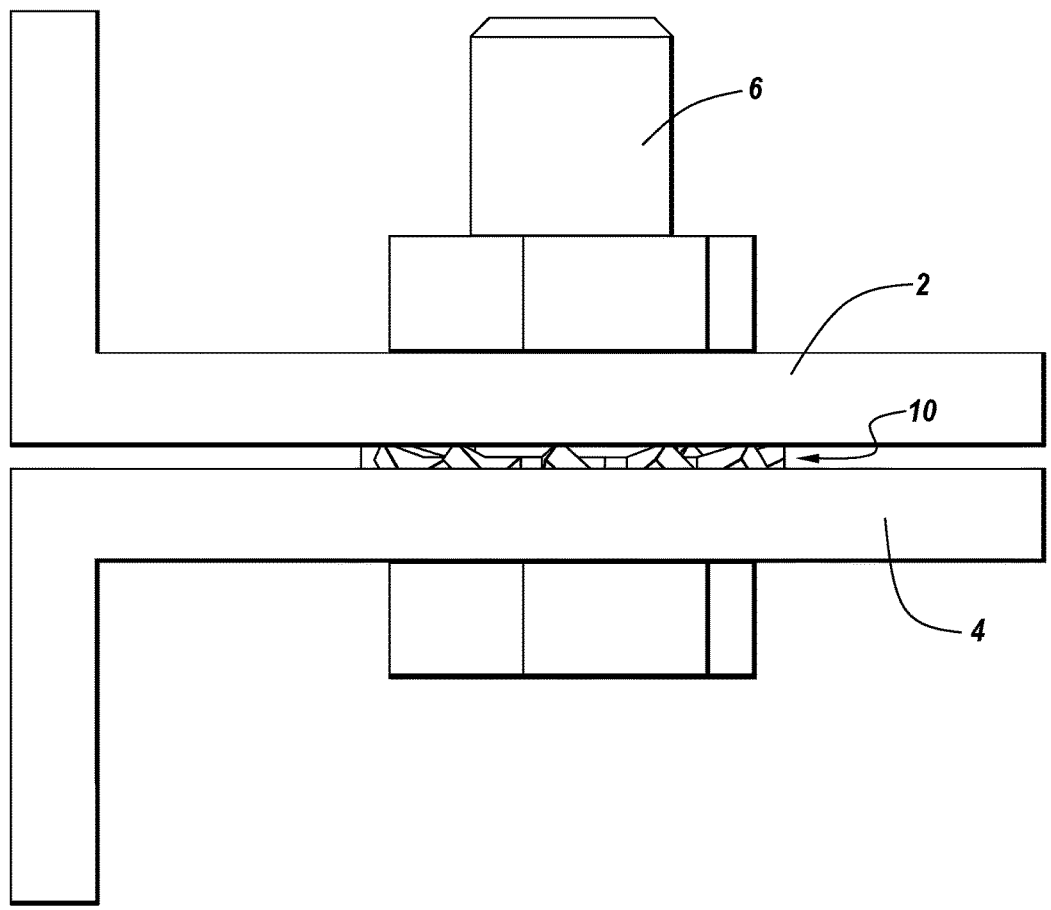
FIG. 4 is a side-view illustration of the apparatus in use with two metal structures after being compressed therebetween, in accordance with the first exemplary embodiment of the present disclosure.
Figure 5:
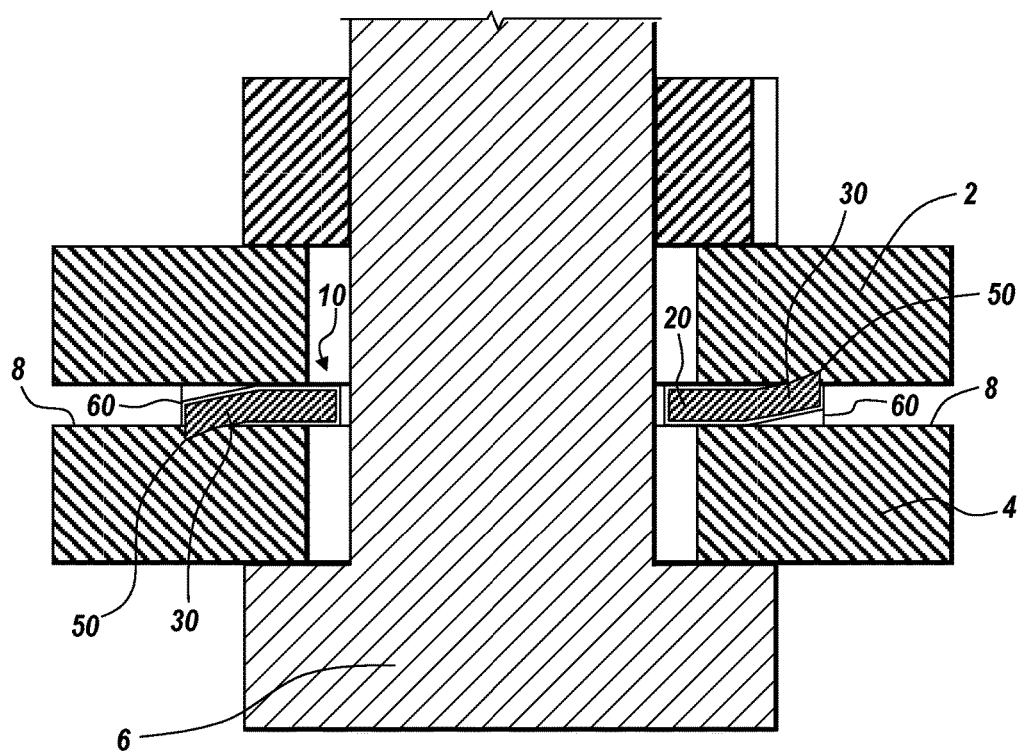
FIG. 5 is a side, cross-sectional illustration of the apparatus in use with two metal structures after being compressed therebetween, in accordance with the first exemplary embodiment of the present disclosure.

FIG. 4 is a side-view illustration of the apparatus 10 in use with two metal structures after being compressed therebetween, in accordance with the first exemplary embodiment of the present disclosure. FIG. 5 is a side, cross-sectional illustration of the apparatus 10 in use with two metal structures after being compressed therebetween, in accordance with the first exemplary embodiment of the present disclosure. As shown, the apparatus 10 is fully compressed between the two structures 2, 4 with the puncture points 50 of each tooth 30 forced into engagement with one of the two structures 2, 4 such that the puncture point 50 penetrates through the inner surface of the two structures 2, 4. Further, it can be seen that the coating 60 has been displaced from the puncture points 50 and has accumulated in the area immediately proximate to the engagement of the puncture points 50 to the two structures 2, 4.

When the apparatus 10 is positioned in the position shown in FIGS. 4-5, it may act as an anti-rotation connection between the two structures 2, 4. Specifically, the engagement of the puncture points 50 into the two structures 2, 4 may prevent a rotational movement of the apparatus 10 and a rotational movement of the two structures 2, 4 relative to one another about the central axis of the fastener 6. The apparatus 10 also provides a sealed electrical connection between the two structures 2, 4, since an electric current can be run between the two structures 2, 4 by passing through the teeth 30 of the apparatus 10 via the puncture points 50. Advantageously, the displaced coating 60 about each of the puncture points 50 seals each engagement of the puncture points 50 to the structures 2, 4 from fluids, gasses, or other substances which can reduce corrosion of the joint using the apparatus 10. In particular, the configuration of the apparatus 10 with the circular body 20 and a plurality of radially-positioned teeth effectively provides a fully sealed barrier from the exterior of the apparatus 10 inwards, similar to a gasket or O-ring, thereby preventing fluids and gasses from contacting any point of the apparatus 10 inward of the exterior-most coating 60. This structure is capable of successfully encapsulating the electrical connection formed through the apparatus 10 without the need to apply additional sealants after installation, as is conventionally done in the industry. Another substantial benefit of the seal created by the coating 60 is the ability to insulate the electrical connection provided by the apparatus 10 without the need to apply additional sealants post-installation.

Relative to FIG. 5, it is noted that the structures 2, 4 may commonly be metal structures with coatings 8 positioned on their exterior surfaces. For example, a metal structure with a non-conductive coating, an anodized coating, galvanization, paint, electrical insulation coatings, or similar surface coatings. These coatings may be desired to increase the resistance of the metal structure 2, 4 of corrosion or wear, provide better paint adhesion, or to provide various cosmetic effects on the structures 2, 4. When a structure has an anodic layer on its surface, it may be electrically non-conductive. The apparatus 10 allows for proper electrical and mechanical connection between the two structures 2, 4 regardless of the surface coating, since the puncture points 50 can penetrate through the exterior layer of the structures 2, 4 having the coating 8 and properly engage with the underlying metal substrate. Accordingly, an electrical and/or mechanical connection can be made without either the apparatus 10 or the two structures 2, 4 coming into contact with the atmosphere. The ability to have an electrical connection between two structures with the apparatus 10 without contacting the atmosphere may be especially useful in corrosive environments, such as marine or industrial manufacturing with corrosive byproducts.

Further, structures which are conventionally connected between star tooth washers may often have surface coatings 8, such as paints and lacquers, which are subject to chipping, flaking, or similar damage when they're contacted by the teeth of the star tooth washer. When the apparatus 10 is used, however, the coating 60 on the apparatus 10 will trap any cracked, chipping, or flaked surface coatings 8 in position. Additionally, the coating 60 may also prevent large cracks or flakes from forming on surface coatings 8 of the two structures 2, 4, thereby maintaining the coating integrity outside of the major diameter of the apparatus 10. This benefit may be especially useful when mechanical or electrical bonding connections need to be made in clean room environments.

Relative to FIG. 5, it is further noted that it is important for the thickness of the coating 60 on the body 20 to be correctly sized. If the thickness of the coating 60 on the body 20 is too great, the compression of the structures 2, 4 against the body 20 may be hindered by the thick coating 60, which may lessen the impact of the puncture points 50 of the teeth 30. When this situation occurs, the puncture points 50 may not be able to be engaged with structures 2, 4 enough to provide a long lasting, successful connection. Accordingly, the apparatus 10 may have a coating 60 thickness on the body 20 that is thin enough to allow the puncture points 50 of the teeth 30 to engage with the structures 2, 4 to a sufficient degree to permit successful connections with the apparatus 10. At the same time, it is desired for the coating 60 thickness proximate to the teeth 30 to be sufficient enough to properly seal the physical connection between the structures 2, 4 and the teeth 30.

Figure 6:
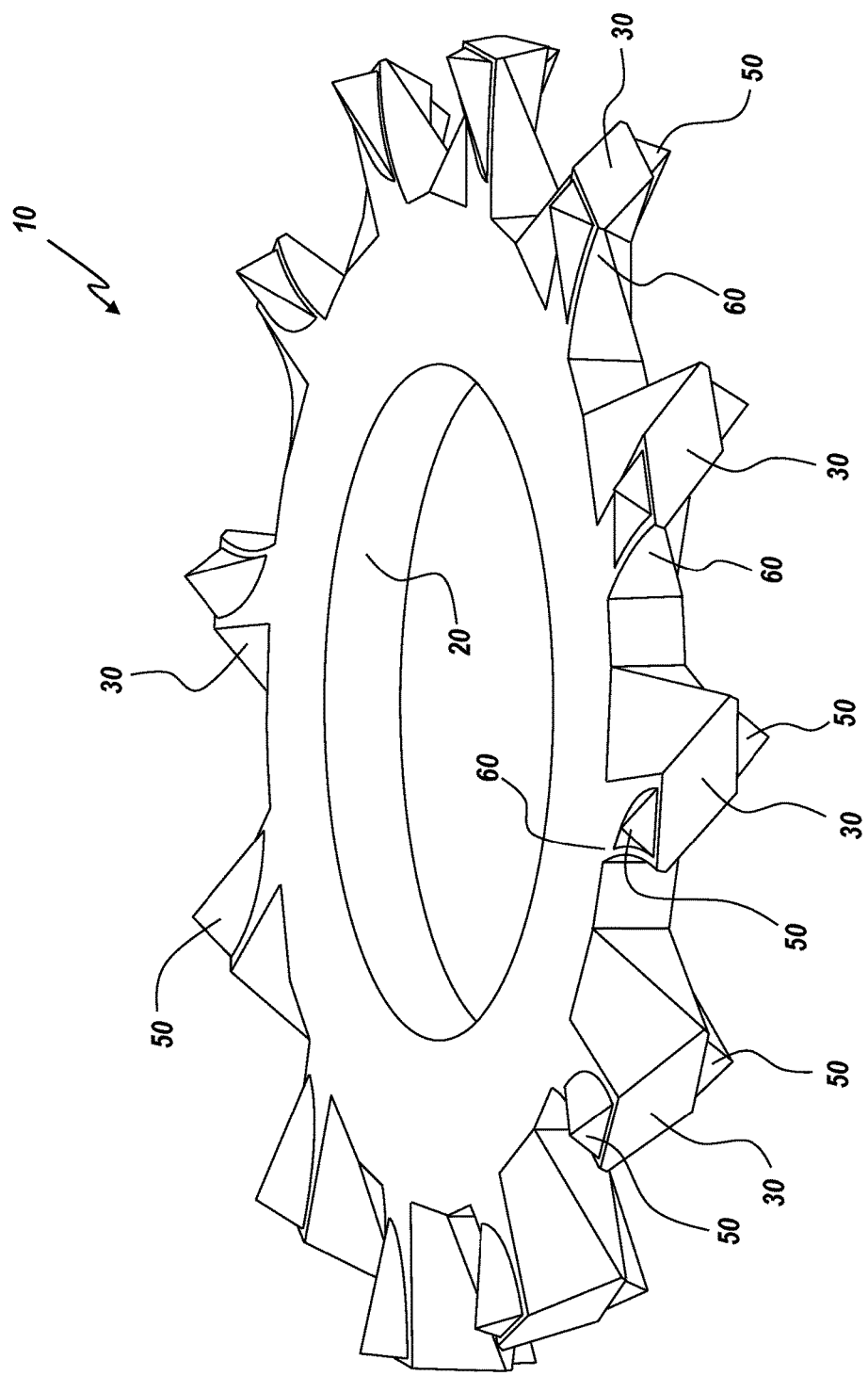
FIG. 6 is an elevated side-view illustration of the apparatus of FIGS. 1-2 after engagement with two structures, in accordance with the first exemplary embodiment of the present disclosure.

FIG. 6 is an elevated side-view illustration of the apparatus 10 of FIGS. 1-2 after engagement with two structures, in accordance with the first exemplary embodiment of the present disclosure. As can be seen, each of the teeth 30 of the apparatus 10 has a puncture point 50 where the coating 60 has been displaced, such that the puncture point 50 is exposed. Beyond the exposed puncture point 50, however, the coating 60 remains on the exterior surface of the teeth 30 and the body 20. It is further noted that due to the flexible properties of the coating 60, after an apparatus 10 is removed from compression between two structures, the coating 60 displaced from the puncture points 50 may partially return to its original position on the puncture points 50.

Figure 7:
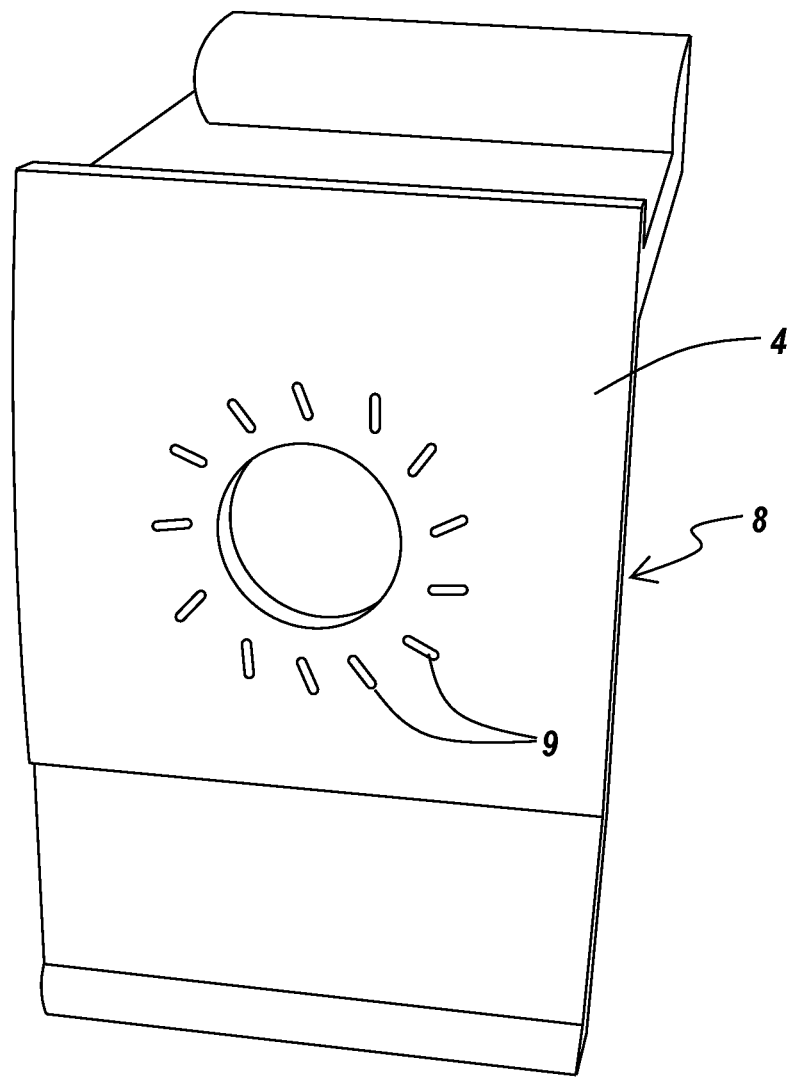
FIG. 7 is an elevated side-view illustration of a structure after engagement with the apparatus, in accordance with the first exemplary embodiment of the present disclosure.

FIG. 7 is an elevated side-view illustration of a structure 4 after engagement with the apparatus 10, in accordance with the first exemplary embodiment of the present disclosure. The inner surface of the structure 4 is shown with the surface coating 8, where grooves 9 have been formed through the surface coating 8 due to the engagement with the puncture points 50 (FIG. 6). These grooves 9 allow for the puncture points 50 to make the electrical and mechanical connection between the structure 4 and the apparatus 10.

Figure 8:
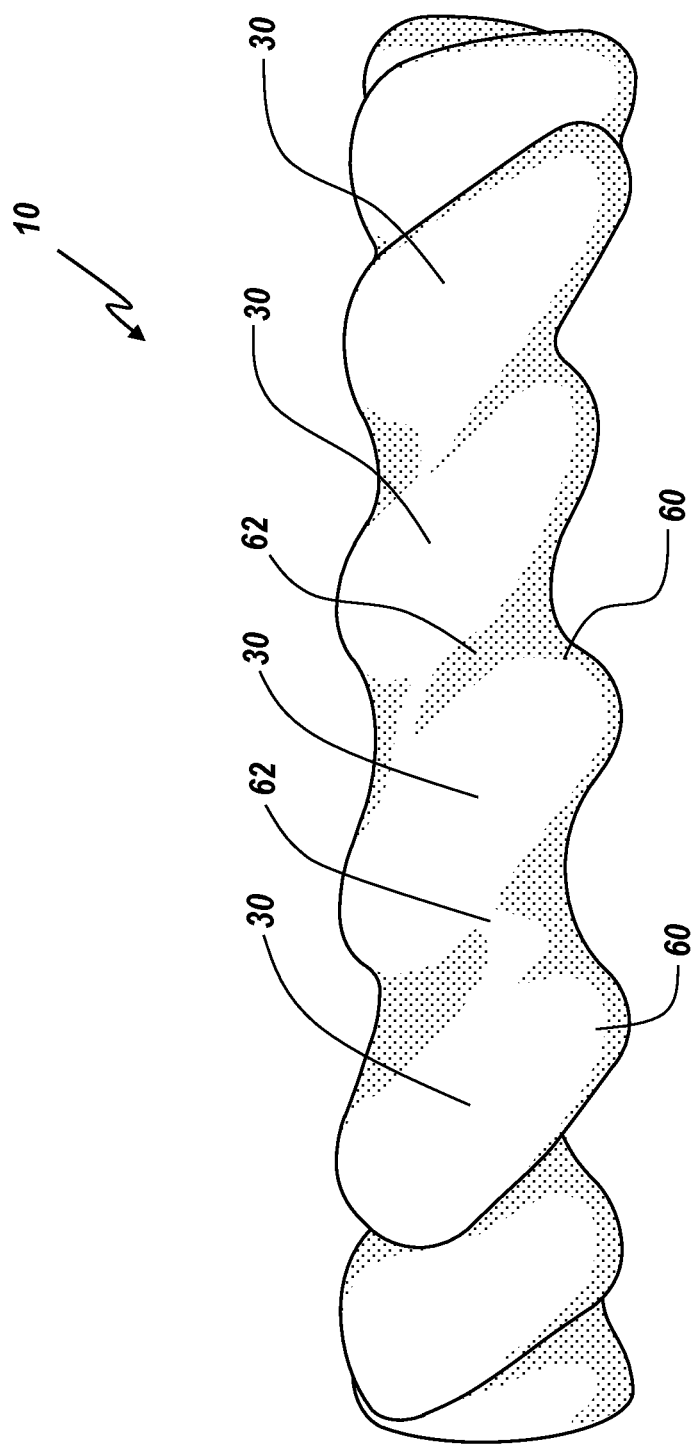
FIG. 8 is a side-view illustration of the apparatus of FIGS. 1-2, in accordance with the first exemplary embodiment of the present disclosure.

FIG. 8 is a side-view illustration of the apparatus 10 of FIGS. 1-2, in accordance with the first exemplary embodiment of the present disclosure. In particular, FIG. 8 illustrates in detail the coating 60 positioned on each of the teeth 30 and in the spaces about the apparatus 10 between each of the teeth 30. The coating 60 in the spaces between the teeth 30 may be referred to as a webbing 62 of coating 60. The webbing 62 of the coating 60 may occupy, for example, a substantial portion of the space between the lateral sides of each tooth 30 relative to an adjacent tooth, such that the general outline of the individual teeth 30 is evident but the free space between the teeth is largely occupied by the coating 60. The size of the webbing 62 may be dependent on the type and quantity of coating 60 used, the shape and dimension of the teeth 30 and body 20, and on the method for applying the coating 60 to the teeth 30. It is noted that the thickness of the webbing 62 on the exterior radial edge of the body between each of the plurality of teeth 30 may commonly be greater than a thickness of the coating on each of the plurality of teeth 30, e.g., the depth of the coating 60 on the top or bottom of the tooth 30.

The webbing 62 may provide a number of benefits and functions to the apparatus 10. For example, the webbing 62 acts to bridge the space between each individual tooth of the apparatus 10 and serves as a way of containing additional coating 60 on the apparatus, thereby providing additional sealing abilities of the apparatus without increasing the thickness of the coating 60 in other areas of the apparatus 10. Thus, when the apparatus 10 is compressed and the teeth 30 are biased, the additional coating 60 in the webbings 62 may be displaced to seal between the two structures the apparatus 10 is compressed between. The webbing 62 of coating 60 may also act as a reinforcement between the individual teeth 30 of the apparatus 10, which can help prevent the teeth 30 from flattening out when the apparatus 10 is compressed during installation between the two structures. It is noted that the webbings 62 of the coating 60 can also be applied to other designs of the apparatus 10 that could benefit from additional sealing abilities and/or reinforcements. For example, the coating 60 may be applied to a conical tooth WEEB® washer, serrated edge clamps, and other types of piercing features that can benefit from an integrated coating and sealing action.

Figure 9:
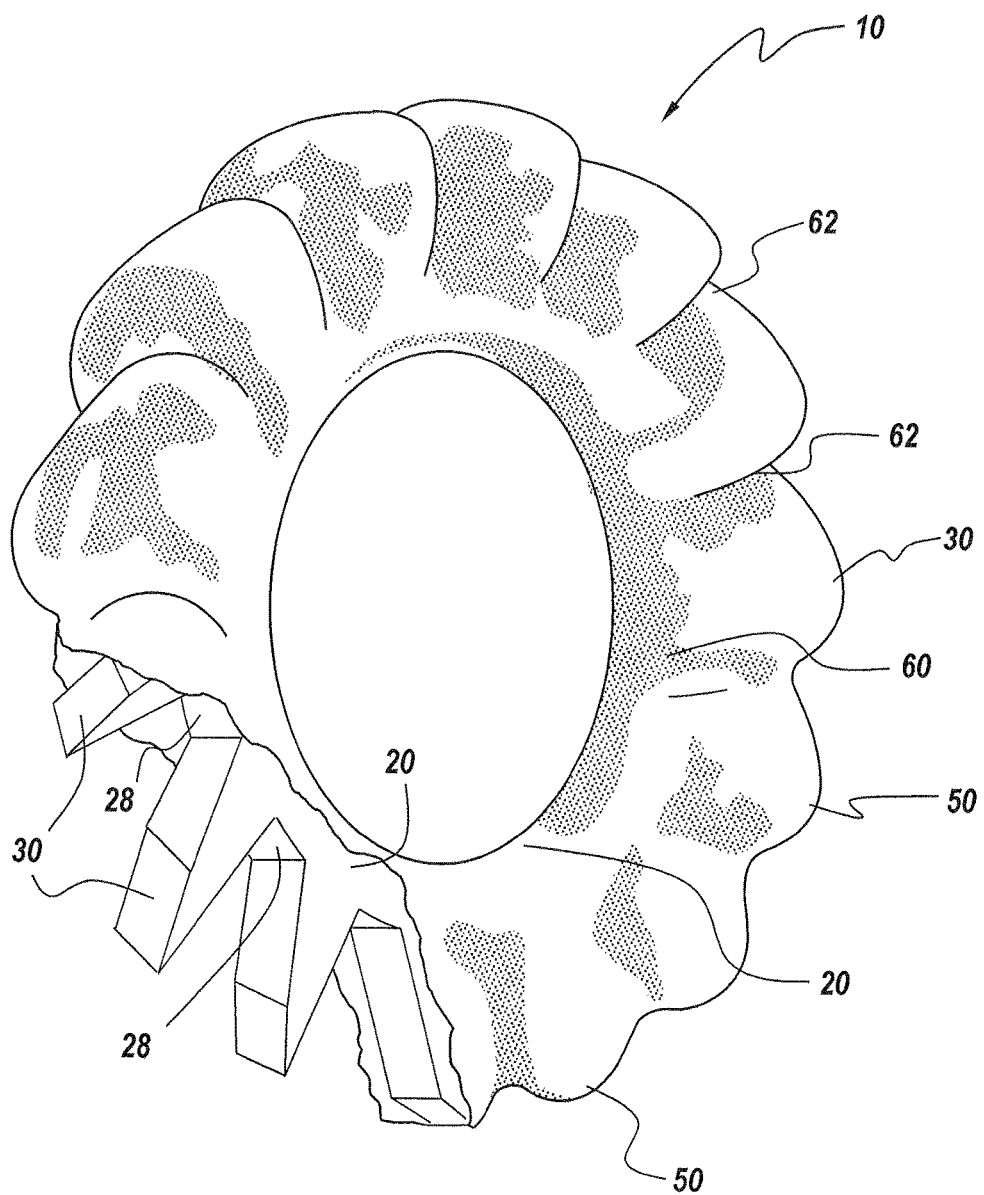
FIG. 9 is a front-view illustration of the apparatus of FIGS. 1-2 with a full coating and with a partial cut-away of the coating, in accordance with the first exemplary embodiment of the present disclosure.
Figure 10:
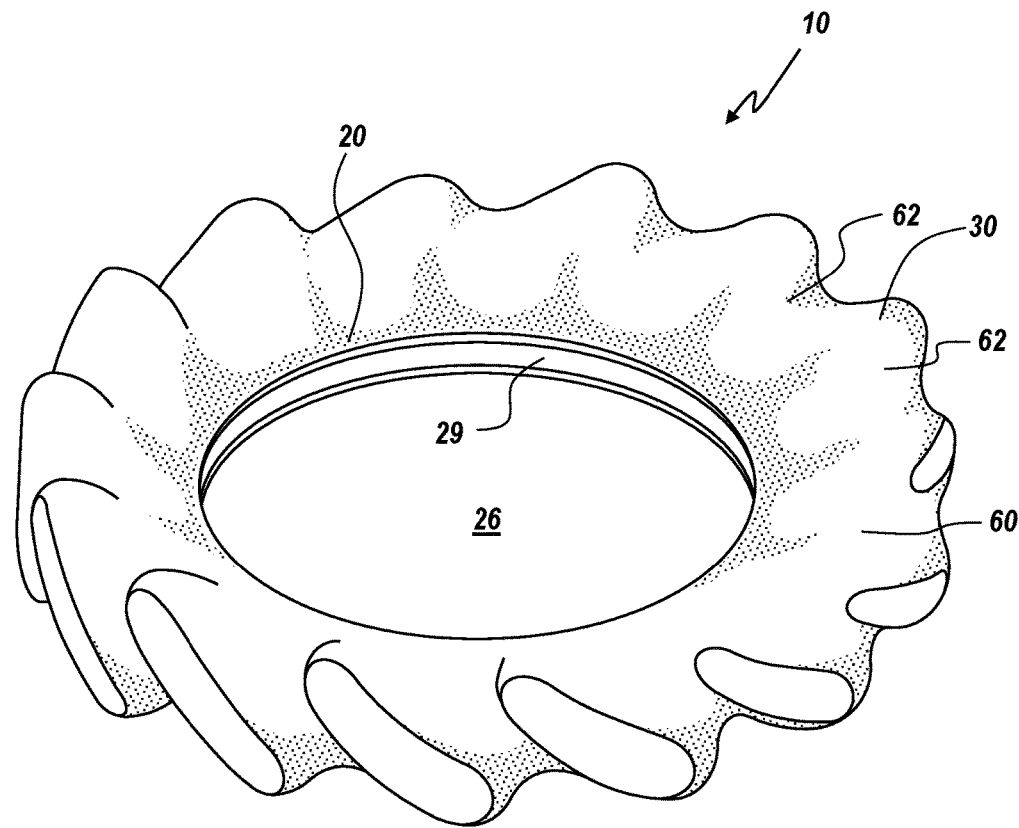
FIG. 10 is a front-view illustration of the apparatus of FIGS. 1-2 with a coating absent on an inner sidewall of the clearance hole, in accordance with the first exemplary embodiment of the present disclosure.

FIG. 9 is a front-view illustration of the apparatus 10 of FIGS. 1-2 with a full coating 60 and with a partial cut-away of the coating 60 showing the body 20 and teeth 30 of the apparatus 10, in accordance with the first exemplary embodiment of the present disclosure. FIG. 10 is a front-view illustration of the apparatus 10 of FIGS. 1-2 with a coating 60 absent on an inner sidewall of the clearance hole 26, in accordance with the first exemplary embodiment of the present disclosure. The apparatus 10 may have a coating 60 that covers an entirety of the apparatus 10, as is shown in FIG. 9, or a portion of the apparatus 10, as shown in FIG. 10. Specifically, in FIG. 10, the coating 60 is positioned on all of the teeth 30 and a substantial portion of the body 20, yet is absent on the inner sidewall 29 of the body 20 that defines the clearance hole 26. The absence of the coating 60 on the sidewall 29 and on other interior portions of the body 20 may allow for a snug fit of the apparatus 10 on a fastener positioned through the clearance hole 26. Further, the absence of the coating 60 in these positions may not disadvantage the sealing abilities of the apparatus 10, since the coating 60 positioned proximate to the teeth 30 may still be capable of preventing fluid or gas contact with the interior of the apparatus 10.

Figure 11:
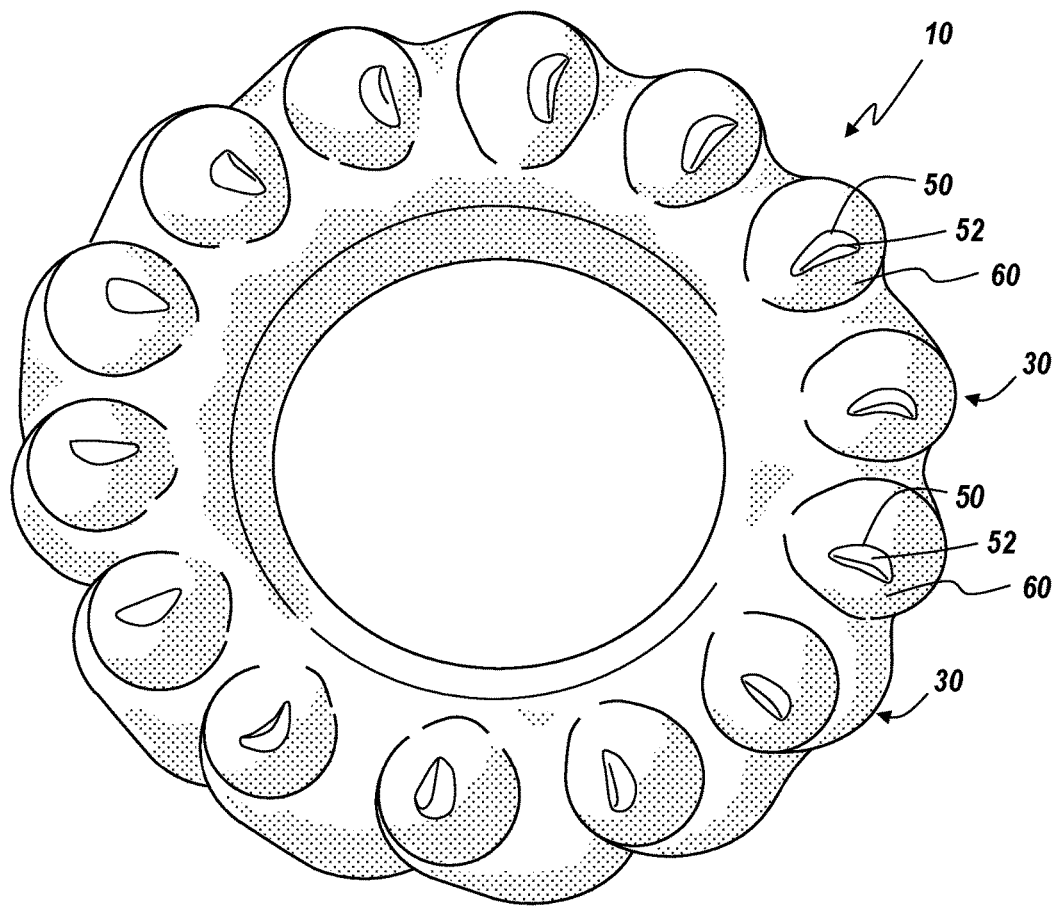
FIGS. 11-12 are top and side view illustrations of the apparatus of FIGS. 1-2 with teeth exposed through the coating, in accordance with the first exemplary embodiment of the present disclosure.
Figure 12:
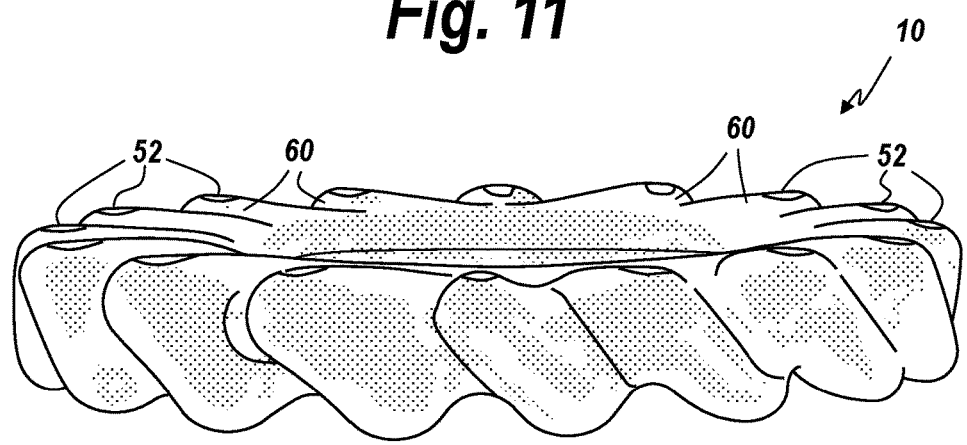

FIGS. 11-12 are top and side view illustrations of the apparatus 10 of FIGS. 1-2 with terminating ends of puncture points 50 exposed through the coating 60, in accordance with the first exemplary embodiment of the present disclosure. In particular, FIGS. 11-12 illustrate the apparatus 10 with a configuration where the coating 60 about each of the teeth 30 is slightly removed from the puncture points 50, thereby allowing only a terminating end 52 of each of the puncture points 50 to be exposed through the coating 60 a significantly small distance. In this design, the terminating end 52 of the puncture points 50 may extend beyond the outer surface of the coating 60 only to a barely noticeable degree, such that the terminating ends 52 may appear to be substantially aligned or flush with the outer surface of the coating 60 on the end of the teeth 30. This design may offer a number of benefits, including the ability for one to visibly identify that the apparatus 10 is a structure with teeth 30 and puncture points 50.

FIG. 13 is a flowchart 100 illustrating a method of electrically connecting at least two metal structures together, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a first metal structure is connected to a second metal structure with a fastener, wherein an electrical connecting device having a coating over at least one tooth is positioned between the first and second metal structures. The fastener is biased to compress the at least one tooth between the first and second metal structures, thereby compressing at least one puncture point on the at least one tooth against at least one of the first and second metal structures, wherein the at least one puncture point displaces the coating on the at least one puncture point (block 104). The method may include any number of additional steps, processes, or functions, including any included in this disclosure. For example, when the first and second metal structures are compressed, the at least one puncture point may be embedded into at least one of the first and second metal structures, wherein the coating formed on the tooth of the at least one puncture point seals against the at least one of the first and second metal structures. The coating may seal an entirety of a connection between the first and second metal structures using the fastener from exposure to an atmosphere within the coating of the electrical connecting device.

The apparatus and related methods and systems may provide numerous advantages over the conventional devices currently used. For example, the apparatus may be easy to manufacture, since the coating may be applied to part or all of the body and teeth without restricting or localizing the coating. The coating may protect both the apparatus itself and the electrical and/or mechanical connection created by using the apparatus from corrosion by acting as a seal for the connection without the need to apply a sealant post-installation. Further, the coating also acts as a reinforcing member for the apparatus since it bridges across the teeth and body, thereby altering the way the apparatus deforms upon installation. Further, the webbings of the coating may accumulate in between the teeth and puncture points of the apparatus, where it is effectively stored as a reservoir of sealant that can be forced out as the apparatus is installed.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An electrical connecting apparatus comprising:
 a substantially flat body having a top surface and a bottom surface;
 at least two electrically conductive teeth positioned on and extending radially outwards from an exterior radial edge of the body, the at least two teeth each having at least one puncture point positioned beyond at least one of the top and bottom surfaces, respectively; and
 a coating covering the at least two teeth, wherein the coating directly contacts an entirety of an exterior surface of each of the at least two teeth, and wherein the coating forms a webbing between the at least two teeth and directly in contact with the exterior radial edge of the body between the at least two teeth.

2. The electrical connecting apparatus of claim 1, wherein the body further comprises a clearance hole positioned therein, the clearance hole formed between the top and bottom surfaces.

3. The electrical connecting apparatus of claim 1, wherein the coating is positioned over an entirety of surfaces of the body.

4. The electrical connecting apparatus of claim 1, wherein the at least two teeth further comprise a plurality of teeth positioned on the exterior radial edge of the body and spaced around a circumference of the body, wherein the plurality of teeth extend radially outwards from the exterior radial edge.

5. The electrical connecting apparatus of claim 1, wherein the at least two teeth are biasable in a direction substantially perpendicular to a plane of at least one of the top and bottom surface of the body.

6. The electrical connecting apparatus of claim 1, wherein a thickness of the webbing on the exterior radial edge of the body between each of the at least two teeth is greater than a thickness of the coating on each of the at least two teeth.

7. The electrical connecting apparatus of claim 1, wherein each of the at least two teeth has at least two puncture points positioned on opposing sides thereof, wherein one of the at least two puncture points extends beyond a top surface of the body and another of the at least two puncture points extends beyond a bottom surface of the body.

8. The electrical connecting apparatus of claim 1, wherein the coating is positioned in direct contact with an entirety of the exterior radial edge of the body between the at least two teeth.

9. A system for providing an electrical connection comprising:
   a first metal structure;
   a second metal structure removably connected to the first metal structure with a fastener; and
   an electrical connecting apparatus positioned between the first and second metal structures, the electrical connecting apparatus comprising:
      a substantially flat body with a top surface and a bottom surface;
      at least two electrically conductive teeth positioned on and extending radially outwards from an exterior radial edge of the body, the at least two teeth each having at least two puncture points positioned beyond the top and bottom surfaces, respectively, and in contact with the first and second metal structures, respectively; and
      a coating covering an entirety of an exterior surface of each of the at least two teeth except the at least two puncture points, wherein the coating forms a webbing between the at least two teeth and directly in contact with the exterior radial edge of the body between the at least two teeth.

10. The system of claim 9, wherein the at least two teeth further comprises a plurality of teeth positioned on an exterior radial edge of the body and spaced around a circumference of the body, wherein the plurality of teeth extend radially outwards, and wherein the webbing is positioned between all of the plurality of teeth.

11. The system of claim 10, wherein a thickness of the webbing on the exterior radial edge of the body between each of the plurality of teeth is greater than a thickness of the coating on each of the plurality of teeth.

12. The system of claim 9, wherein the at least two puncture points are positioned on opposing sides of each tooth, wherein one of the at least two puncture points pierces the first metal structure and another of the at least two puncture points pierces the second metal structure.

13. The system of claim 12, wherein the coating seals a connection of the at least two puncture points to the first and second metal structures from exposure to an atmosphere.

14. An electrical connecting device comprising:
   a serrated tooth star washer having a plurality of teeth positioned radially extending from a washer body; and
   a coating positioned over an entirety of each of the plurality of teeth, wherein the coating forms a webbing extending between lateral sides of adjacent teeth of each of the plurality of teeth and directly in contact with an exterior radial edge of the washer body between each of the plurality of teeth, wherein when the serrated tooth star washer is compressed, at least one puncture point on each of the plurality of teeth pierces through the coating thereon.

15. The electrical connecting device of claim 14, wherein when the serrated tooth star washer is compressed, a portion of the webbing is displaced from between each of the plurality of teeth.

* * * * *